United States Patent
Baer et al.

(10) Patent No.: US 11,546,054 B2
(45) Date of Patent: Jan. 3, 2023

(54) UTILIZING LEFTOVER RETURN CHANNEL BANDWIDTH IN A SATELLITE SYSTEM

(71) Applicants: Matthew Baer, Gaithersburg, MD (US); Tayyab Khan, Gaithersburg, MD (US)

(72) Inventors: Matthew Baer, Gaithersburg, MD (US); Tayyab Khan, Gaithersburg, MD (US)

(73) Assignee: Hughes Network Systems, LLC, Germantown, MD (US)

(*) Notice: Subject to any disclaimer, the term of this patent is extended or adjusted under 35 U.S.C. 154(b) by 193 days.

(21) Appl. No.: 17/136,763

(22) Filed: Dec. 29, 2020

(65) Prior Publication Data
US 2022/0209861 A1 Jun. 30, 2022

(51) Int. Cl.
*H04B 7/212* (2006.01)
*H04B 7/185* (2006.01)

(52) U.S. Cl.
CPC ......... *H04B 7/212* (2013.01); *H04B 7/18513* (2013.01)

(58) Field of Classification Search
None
See application file for complete search history.

(56) References Cited

U.S. PATENT DOCUMENTS

| | | | |
|---|---|---|---|
| 2002/0099854 A1* | 7/2002 | Jorgensen | H04L 9/40 370/310 |
| 2015/0222561 A1* | 8/2015 | Okuno | H04L 49/90 370/235 |
| 2017/0280357 A1* | 9/2017 | Finn | H04L 49/9005 |

OTHER PUBLICATIONS

International Search Report for PCT Application PCT/US2021/062980.
Zhang H et al: "A Variable Slot Length TDMA Protocol for Personal Communication Systems", Wireless Personal Communications, Springer, Dordrecht, NL. vol. 22, No. 3, Sep. 1, 2002 (Sep. 1, 2002), pp. 409-432, XP001124778, ISSN: 0929-6212, DOI: 10.1023/A: 1020232331191 paragraph [Section 1"Introduction"] paragraph [Section4.2 "Transmission scheduling"].

* cited by examiner

*Primary Examiner* — Shripal K Khajuria
(74) *Attorney, Agent, or Firm* — Capitol City TechLaw; Jasbir Singh (57) ABSTRACT

An apparatus and method for using a bandwidth (BW) allocation in a Time Division Multiple Access (TDMA) network. The method includes filling a buffer having a buffer length with a demand-inducing stream data until either the demand-inducing stream data is exhausted or the buffer length equals the BW allocation, determining a leftover BW as the BW allocation minus the buffer length after the filling, composing a leftover buffer when demand-deferring stream data is present, where the leftover buffer includes a transmission header (TH) and a transmission data (TD) includes a portion of a demand-deferring stream data, and transmitting the buffer and the leftover buffer in a time slot associated with the BW allocation. In the method, a length of the TH plus a length of the TD is less than or equal to the leftover BW.

18 Claims, 6 Drawing Sheets

UTILIZING LEFTOVER RETURN CHANNEL BANDWIDTH IN A SATELLITE SYSTEM

FIELD

In a Time Division Multiple Access (TDMA) network, rather than transmitting null padding bytes during a leftover bandwidth availability, a demand-deferring data stream may be sent when the leftover bandwidth is available. This demand-deferring data stream would not preempt demand-inducing control and/or traffic data streams. Based on a packet type, the demand-deferring data sent by the transmitter may be consumed by a receiver or forwarded to a destination node beyond the receiver. As the leftover bandwidth availability is variable in size and periodicity, transmitting and reassembly of thine demand-deferring data stream may use a protocol supporting segmentation of packets. In some embodiments, the protocol may support a retransmission of missing segments. In some embodiments, the protocol may provide a checksum for verification of proper packet reassembly.

BACKGROUND

In a Time Division Multiple Access (TDMA) network, multiple transmitters may share a transmission channel by dividing access to the channel into discrete time slots. Once a transmitter has accessed the network, for example, through a Random Access Channel (RACH), a dynamic bandwidth scheduler may provide a transmitter with bandwidth allocations on the shared channel, which allocations are non-overlapping in time for the shared channel. The allocated bandwidth may be based on numerous inputs, including but not limited to a permitted service rate of the transmitter, the amount of queued data at the transmitter, anticipated packet arrival rate at the transmitter, leftover bandwidth allocations for a given time epoch, and the like.

In practice, over the course of a transmitter's allocated bandwidth session, the transmitter may be provided with more bandwidth than it demanded. This may occur due to improved compression on the transmitter, improved link efficiency, changes in packet ingress rates at the transmitter, over-demanding by the transmitter, overallocation by the scheduler, or the like. When this occurs, the transmitter uses 'null byte' padding to fill out the bandwidth allocation. The receiver ignores and bypass the null byte padding when processing the transmitted/received frame.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

This present teachings utilize any leftover allocated bandwidth by sending a multitude of packet types and data to the receiver with the leftovers. Consequently, all the allocated bandwidth can be used to transmit meaningful information rather than empty padding bytes.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform a method for using a bandwidth (BW) allocation in a Time Division Multiple Access (TDMA) network. The method includes filling a buffer having a buffer length with a demand-inducing stream data until either the demand-inducing stream data is exhausted or the buffer length equals the BW allocation, determining a leftover BW as the BW allocation minus the buffer length after the filling, composing a leftover buffer when demand-deferring stream data is present, where the leftover buffer includes a transmission header (TH) and a transmission data (TD) includes a portion of a demand-deferring stream data, and transmitting the buffer and the leftover buffer in a time slot associated with the BW allocation. In the method, a length of the TH plus a length of the TD is less than or equal to the leftover BW.

In one aspect, a computing apparatus includes a processor. The computing apparatus also includes a memory storing instructions that, when executed by the processor, configure the apparatus to fill a buffer having a buffer length with a demand-inducing stream data until either the demand-inducing stream data is exhausted or the buffer length equals the BW allocation, determine a leftover BW as the BW allocation minus the buffer length after the filling, compose a leftover buffer when demand-deferring stream data is present, where the leftover buffer includes a transmission header (TH) and a transmission data (TD) includes a portion of a demand-deferring stream data, and transmit the buffer and the leftover buffer in a time slot associated with the BW allocation, where a length of the TH plus a length of the TD is less than or equal to the leftover BW.

In some embodiments, the method or apparatus may include one or more of the following. The method may include receiving the BW allocation from a gateway. The method or apparatus where the TH includes a packet type indicating that the TD includes one or more of an Internet Protocol Version 4 packet, an Internet Protocol version 6 packet, an Ethernet frame, or an operator defined packet. The method or apparatus where the TH supports transport modes indicating a best effort or reliable mode of transmission. The method or apparatus where the demand-deferring stream data includes a priority associated with the demand-deferring stream data, and the adding uses the priority to select data to be added to the leftover buffer. The method or apparatus where the demand-deferring stream data includes a time-to-live associated with the demand-deferring stream data, and the method or apparatus further includes discarding the demand-deferring stream data when the time-to-live has expired. The method or apparatus may include segmenting the demand-deferring stream data such that a length of a segment is less than the leftover BW minus a length of the TH. The method or apparatus may include receiving the leftover buffer, reassembling the demand-deferring stream data per the TH, and forwarding a reassembled demand-deferring stream data per the TH. Other technical features may be readily apparent to one skilled in the art from the following figures, descriptions, and claims.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

Figure 1:
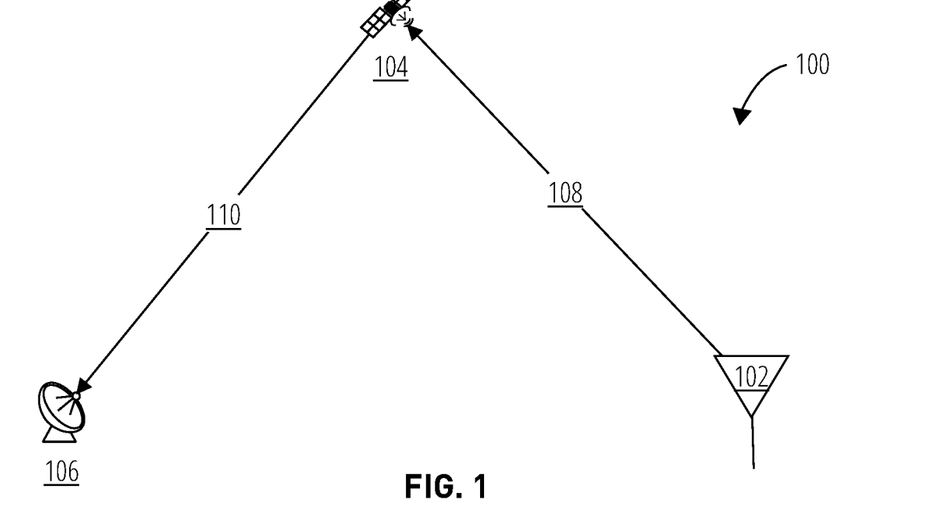
FIG. 1 illustrates an aspect of the subject matter in accordance with one embodiment.

FIG. 1 illustrates an aspect of the subject matter in accordance with one embodiment.

The present teachings allow a transmitter 102 to uplink/transmit 108 useful information when there is unused allocated bandwidth available to a receiver 106. A satellite 104 (or other forwarder) may be used to complete the uplink/transmit 108 between the transmitter 102 and receiver 106. When the satellite 104 is used, the uplink/transmit 108 from the 102 is forwarded by the satellite 104 to the receiver 106 on a downlink/return channel 110.

Figure 2:
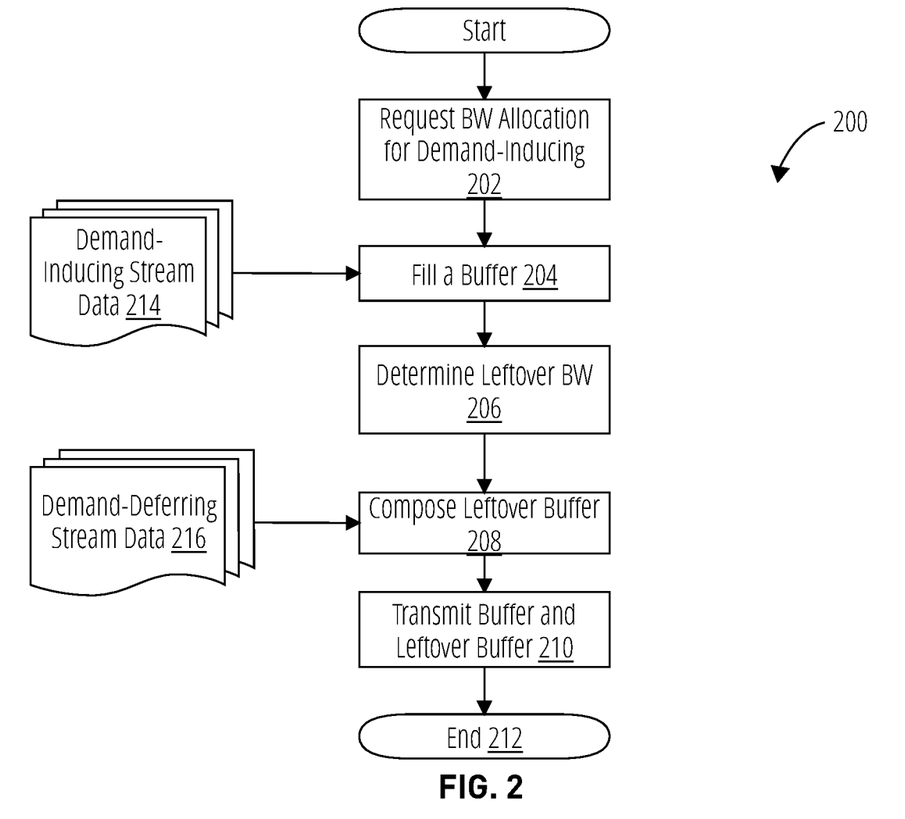
FIG. 2 illustrates an exemplary transmission and reception protocol for utilizing leftover bandwidth according to various embodiments.

FIG. 2 illustrates a transmitter according to various embodiments.

A Transmitter 200 may Request BW Allocation for Demand-inducing 202 stream data based on an aggregated demand for Demand-inducing Stream Data 214. The allocated Bandwidth (BW) based on the request may or may not be sufficient for transmitting the Demand-inducing Stream Data 214. The Transmitter 200 may Fill a buffer 204 with Demand-inducing Stream Data 214 until a length of the buffer remains less than the allocated BW or the Demand-inducing Stream Data 214 has been exhausted. After exhausting Demand-inducing Stream Data 214, the Transmitter 200 may Determine Leftover BW 206 by, for example, subtracting the buffer length from the allocated BW.

When data is pending in Demand-deferring Stream Data 216, the Transmitter 200 may Compose Leftover Buffer 208 by adding a TH and a TD therein. The leftover buffer may have a length equal to the leftover BW. The Compose Leftover Buffer 208 may fill the TD with Demand-deferring Stream Data 216 until it is exhausted or an end of the leftover buffer is reached. In some embodiments, when Demand-deferring Stream Data 216 has been exhausted without reaching an end of the leftover buffer, a remainder of the leftover buffer may be null padded.

In some embodiments, traffic received by the Transmitter 200 may be treated as Demand-inducing Stream Data 214 by default or unless specified otherwise.

In some embodiments, the transmitter may dynamically adapt to the amount of leftover bandwidth available. This may range from transmission opportunities with no leftover bandwidth availability up to transmission opportunities where the entire bandwidth allocation is leftover. The transmitter may adapt to the amount of leftover bandwidth available on each transmission opportunity. Example of information that may be classified as demand-deferring, rather than demand-inducing, may include:

1. Statistics collected inside the transmitter. This could include real-time statistics values or information aggregated over a configurable period.
2. Transmitter status information. This could include a set of configured status values that the transmitter advertises to the receiver.
3. Low priority user data. For example, user equipment connected to the transmitter may provide an ingress of data that can be classified as low priority and time insensitive.
4. Low priority control data. The transmitter may need to send network traffic classified as low priority and time insensitive, for example, control data streams, log files, or the like.
5. Sensor data. Data from devices without receivers or need for acknowledgment, for example, IoT sensor data.

Like the UDP and TCP transport layer protocols, demand-deferring data can be sent either as 'Best Effort' (akin to UDP) or as 'Reliable (akin to TCP). In the Best Effort mode, demand-deferring data is not acknowledged by the receiver. Therefore, any information not received by the receiver will not be retransmitted by the transmitter. Exemplary data streams such as, statistics updates, telemetry data, or the like that do not require reliable data transmission are well suited for best effort transmission. In some embodiments, data streams from Internet of Things (IoT) devices are suited for best effort mode.

There are several approaches that can be taken to use the leftover allocated bandwidth. One approach is to constantly transmit the information repeatedly, until an acknowledgement is received by the transmitter from a receiver. However, this may approach may further congest a network because of the additional acknowledgements and the transmitter may send the same information repeatedly, an ineffective use of bandwidth. Another approach may send all the application payload over the leftover bandwidth, and wait for the receiver to send a singular acknowledgement message after all the segments have been received. However, this is also an ineffective approach. If the receiver does not acknowledge because a single segment was lost, the transmitter needs to send all the information over again.

In yet another approach, the transmitter can send just one segment and wait for an acknowledgement from the receiver, known as a "Stop-and-Wait ARQ". However, the transmitter could potentially be losing the bandwidth while waiting for the acknowledgement from the receiver. A "Go-Back-N", approach may be used where the transmitter keeps transmitting segments and only requires an acknowledgement after N segments have been transmitted. Although this is a more efficient use of the "Stop-and-Wait ARQ", this method may result in sending segments multiple times, when any segment was lost or damaged.

Transmission Mechanics

An exemplary transmission and reception protocol for utilizing leftover bandwidth may be divided into two main parts: Transmission Header (TH) and Transmission Data (TD). The TH may contain and provide information about the type and nature of data that is included in the current segment. The TD may include useful data sent by the transmitter. The transmission header may provide information about the transmission data that is sent in the leftover bandwidth. The transmission header has a fixed size portion and an optional portion. An exemplary TH may include the following fields:

- Packet Type: The Packet Type indicates what type of data is being transmitted to the receiver. This may include (but is not limited to) IPv4 packets, IPv6 packets, Ethernet frames, operator defined statistics packets, or the like.
- Start Packet: The Start Packet indicates that the following Transmission Data (TD) packet is the beginning of a packet. A non-zero value indicates the start of the packet.
- End Packet: The End Packet indicates that the following Transmission Data (TD) packet is the beginning of a packet protocol. A non-zero value indicates the end of the packet.
- CRC Present: The CRC Present field indicates the presence of the Packet CRC field later in the Transmission Header
- More: The More field indicates if there are additional packets following this packet in the series of transmission. If the More bit is non-zero, then there are additional packets to be followed. If the More bit is set to zero (0), then this packet is the last packet in the series.
- Priority: The Priority field indicates the priority of the data encapsulated packet. Lower priority values imply a higher priority. Therefore, zero (0) is the highest priority and a larger number would indicate a lower priority.
- Transaction ID: The Transaction ID field provides an identifier for the packet that is associated with this series of transmissions. The Transaction ID field is maintained on a per-priority basis. The Transaction ID field should increment by one (1) for each new packet sent (on the associated priority) and the Transaction ID field should rollover once the field exceeds the allocated number of bits.
- Data Ack Required: The Data Ack Required field indicates if the receiver should send an acknowledgement packet to the transmitter when packet reassembly has been completed successfully or if there is an error in packet reassembly. A non-zero value indicates an acknowledgement is required and zero (0) value indicates an acknowledgement is not required.
- Transmit Data Length: The Transmit Data Length field indicates the length (in bytes) of the Transmission Data (TD) that follows the header. The Transmit Data Length field excludes the length of the Transmission Header (TH).
- Total Packet Length: The Total Packet Length field indicates the total length (in bytes) of the packet, which is to be assembled by the receiver. The Total Packet Length field is only included when the Start Packet field is non-zero
- Packet CRC: The Packet CRC field is only included if the CRC Present bit is set in the header. The CRC allows the receiver to verify proper reassembly of the transmitted packet.

The Transmission Data (TD) is the user data, control data, status, or statistics information sent by the transmitter. The transmission data section may contain a complete packet (both start and end of packet) or segments of a packet. As described above in the Transmission Header (TH) section, the protocol accommodates sending complete packets or segmenting the packet across multiple transmission opportunities.

Transmission Algorithm

There are four key attributes that influence how data is transmitted using the leftover allocated bandwidth. These attributes include: Packet Type, Packet Priority, Retransmission Policy and Packet Queue Latency. Packets may be generally classified into packets that are part of a larger data flow (for example, a file upload) or a single packet transmission that is not part of a larger data flow (for example, a statistics snapshot). The packet type classification influences how the packets are transmitted using the leftover allocated bandwidth.

Packets that Require a Flow of Data to be Transmitted

Low priority user or control data flows may typically fall into this category. In this use case, a flow of data packets (perhaps a file upload) needs to be sent by the transmitter and successfully reassembled by the receiver. The loss of any packet flow data may diminish the value or validity of the data. Specifically, a missing data packet in the middle would most likely corrupt the entire data stream. Furthermore, a low priority data flow may require more data to be transmitted than what can fit inside a single packet. Low priority user or control data packets may be enqueued to dedicated queues on the transmitter. As leftover bandwidth becomes available, entire packets or segments of packets may be transmitted to the receiver for reassembly.

Regarding the Retransmission Policy, low priority user or control data flows may benefit from reliable transmission. Therefore, if there is any data loss or corruption, the receiver should indicate that a packet was not reassembled correctly. For these packet flows, the transmitter may set the "Ack Required" field in the Transmission Header. If the transmitter does not receive an acknowledgement for successful packet reassembly, the transmitter will retransmit the packet.

Packets that Only Require Single Data Packets to be Sent

Statistics, status or sensor packets may fall into this category. These types of packets are informational in nature and there is no impact to the system or other data flows if these packets are not transmitted or successfully reassembled at the receiver. If the single data packet fits entirely into the leftover bandwidth of a transmission opportunity, the receiver may reassemble the single data packet and process accordingly assuming the transmission is received without error. If the single data packet needs to be segmented and transmitted over multiple transmission opportunities, it is possible that segments of the single data packet may not be successfully received by the receiver.

Regarding the Retransmission policy, these type of statistic and status packets may be marked as 'Best Effort' and do not require retransmission if the packet is not successfully reassembled at the receiver. For these packets, the transmitter may choose to disable the "Ack Required" field when sending these packets.

Packet Priority

The transmitter can have several priority queues that can be used to queue packets to be transmitted over leftover bandwidth. Attributes such as IP flow classification, source address, user vs. control data, or the like can be used for determining the priority. The priority queues can be used by the transmitter to send the highest priority data first and move down the priority queue list if leftover bandwidth remains.

Packet Queue Latency

There could be extended periods of time where the transmitter does not have leftover allocated bandwidth. Packet flows such as low priority and time insensitive user and control packets may not be impacted by these transmission delays. Other packets, such as status and statistics, may not provide value if they are not sent in a timely manner. As the transmitter classifies packets to be sent using leftover bandwidth, a maximum latency attribute or time-to-live for the packet can be set. If a packet resides in the queue for a period longer than its maximum latency, it can be removed from the associated transmission queue.

For example, assume that every one-minute the transmitter generates a statistic packet with key performance indicators. At time $T_0$ a statistic packet is enqueued into a leftover bandwidth transmission queue. At time ($T_0$+ one-minute) a new statistic packet is generated and placed in the queue. If no leftover bandwidth was available during the one-minute, both statistic packets would be in the transmission queue. There may be no value in sending both statistics packets and it may be desirable to discard the packet that was enqueued at time $T_0$.

Segmentation and Reassembly Mechanics

The packet reassembly process relies on the length information and the Start Packet and End Packet indicators in the header. As shown in the following table, there are four types of Segmentation and Reassembly (SAR) packets: Whole, First, Middle and Last. The handling of each type of SAR packet depends on whether the receiver is waiting for a First packet or waiting for a Last packet.

| Start Packet Bit | End Packet Bit | Segmentation and Reassembly Packet Type |
|---|---|---|
| 1 | 1 | Whole |
| 1 | 0 | First |
| 0 | 0 | Middle |
| 0 | 1 | Last |

In the handling of packets received, the receiver may track information it receives from a current packet. The receiver may track incoming packets on 2 levels: Packet Type and Packet Priority, both of which are found in the header of a given packet. This allows multiple packet types and priorities to be assembled by the receiver simultaneously.

Whole Packet Assembly Mechanics

Figure 3:
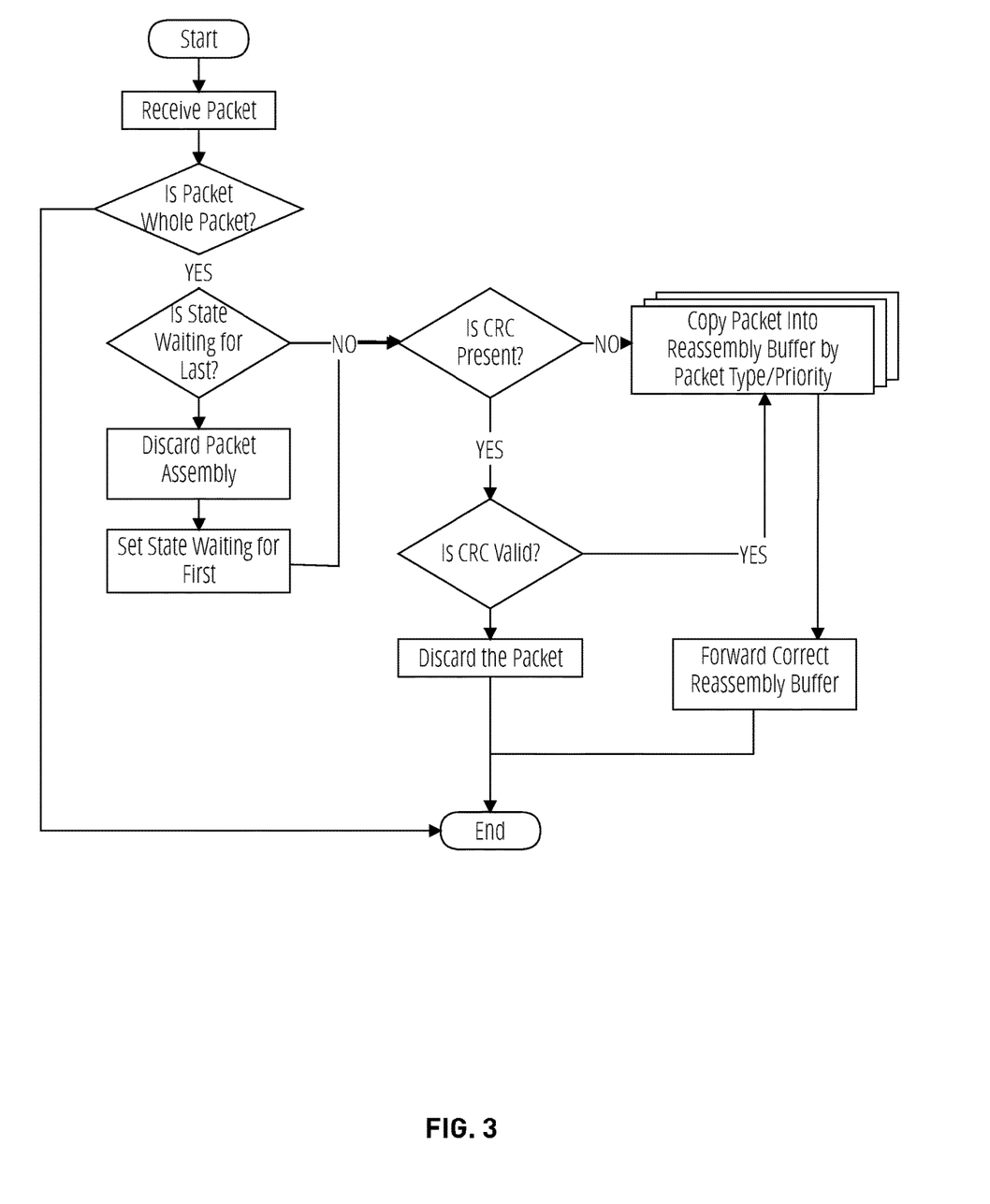
FIG. 3 illustrates an aspect of the subject matter in accordance with one embodiment.

FIG. 3 illustrates a whole packet assembly according to various embodiments.

FIG. 3 illustrates handling of a whole packet sent in leftover bandwidth transmission opportunity. The receiver tracks some information, such as the "Current State". Once the received packet is determined to be a whole packet, the receiver can check the CRC if the packet header has provided a CRC. FIG. 1 also handles error cases. If the "Current State" is "Waiting for Last", it can be deduced that the previous transmission had some error and the packet was lost. In such cases the receiver can discard the buffer and allocate a new "Reassembly Buffer" to process the new incoming packet.

Figure 4:
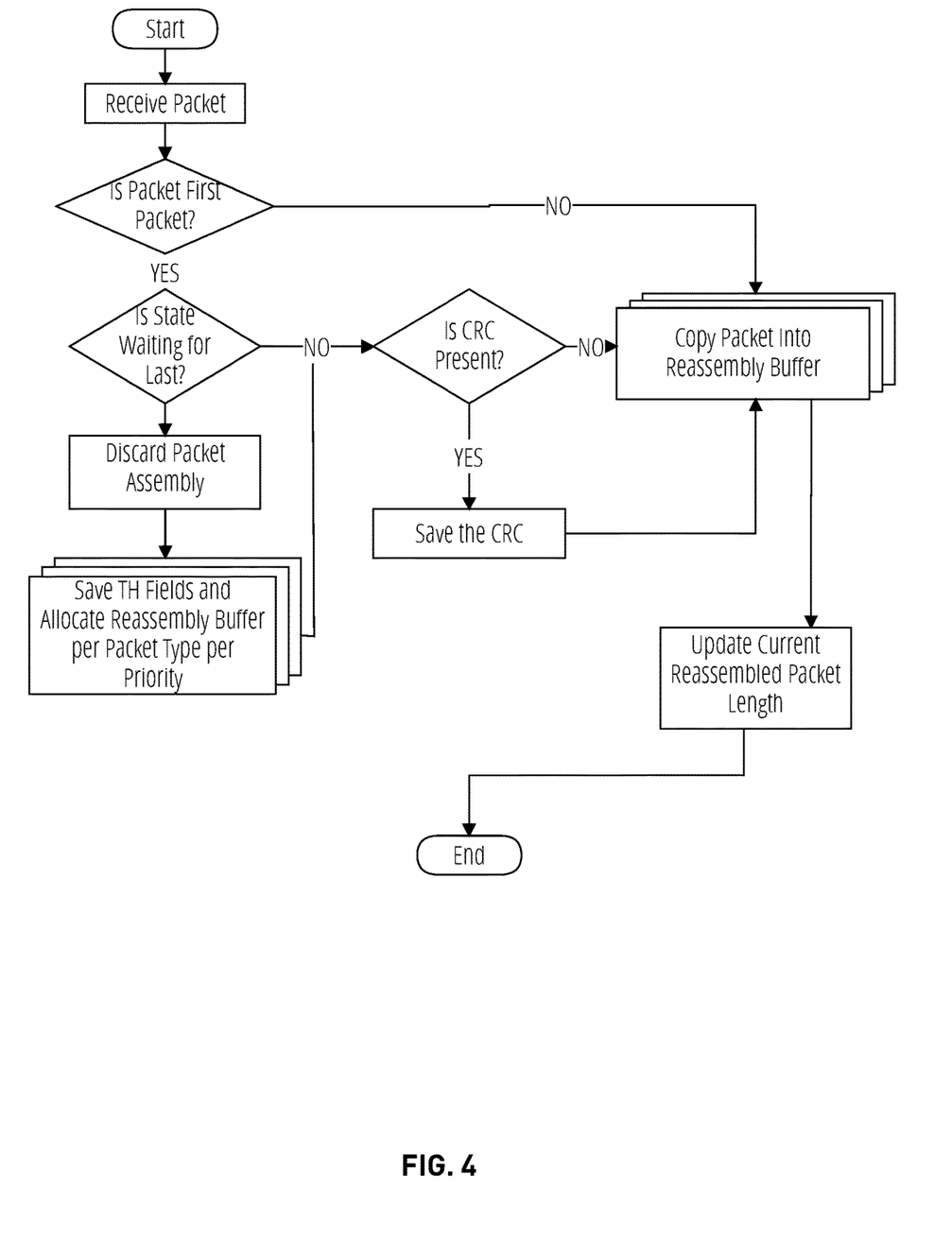
FIG. 4 illustrates handling an incoming first packet according to various embodiments.

FIG. 4 illustrates handling an incoming first packet according to various embodiments.

FIG. 4 illustrates handling an incoming "First Packet". In such cases the receiver stores the provided CRC if it is present in the Transmission Header. The receiver may store other information such as the total packet length and packet length received up until the current transmission.

Figure 5:
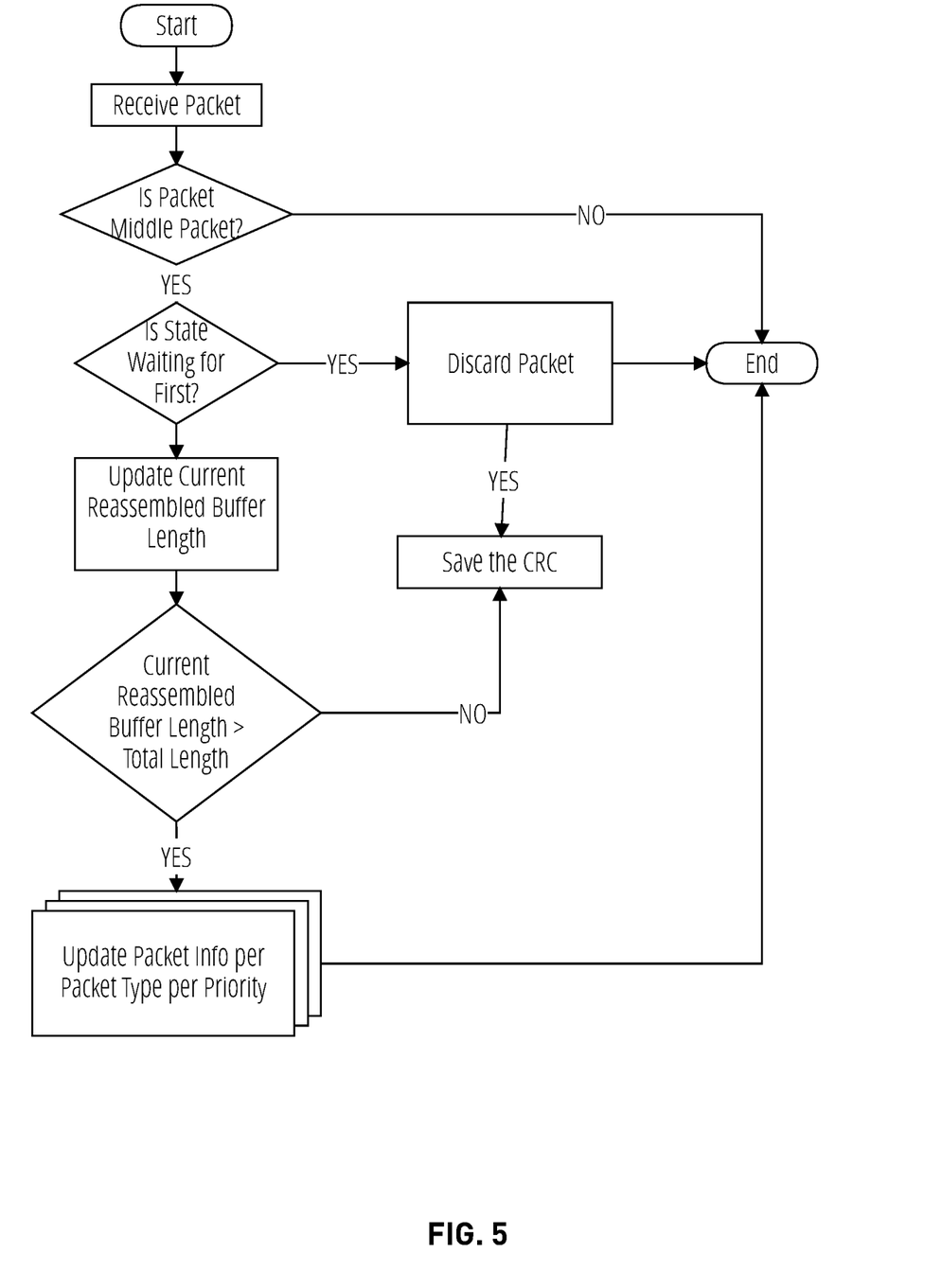
FIG. 5 illustrates handling an incoming middle packet according to various embodiments.

FIG. 5 illustrates handling an incoming middle packet according to various embodiments.

FIG. 5 illustrates the use case for an incoming "Middle Packet". In such cases, the receiver performs validations such as ensuring that the incoming packet length does not exceed the total packet length that was depicted when the "First Packet" was transmitted, the Transaction ID matches the packet that is currently in-progress for reassembly and the like.

Figure 6:
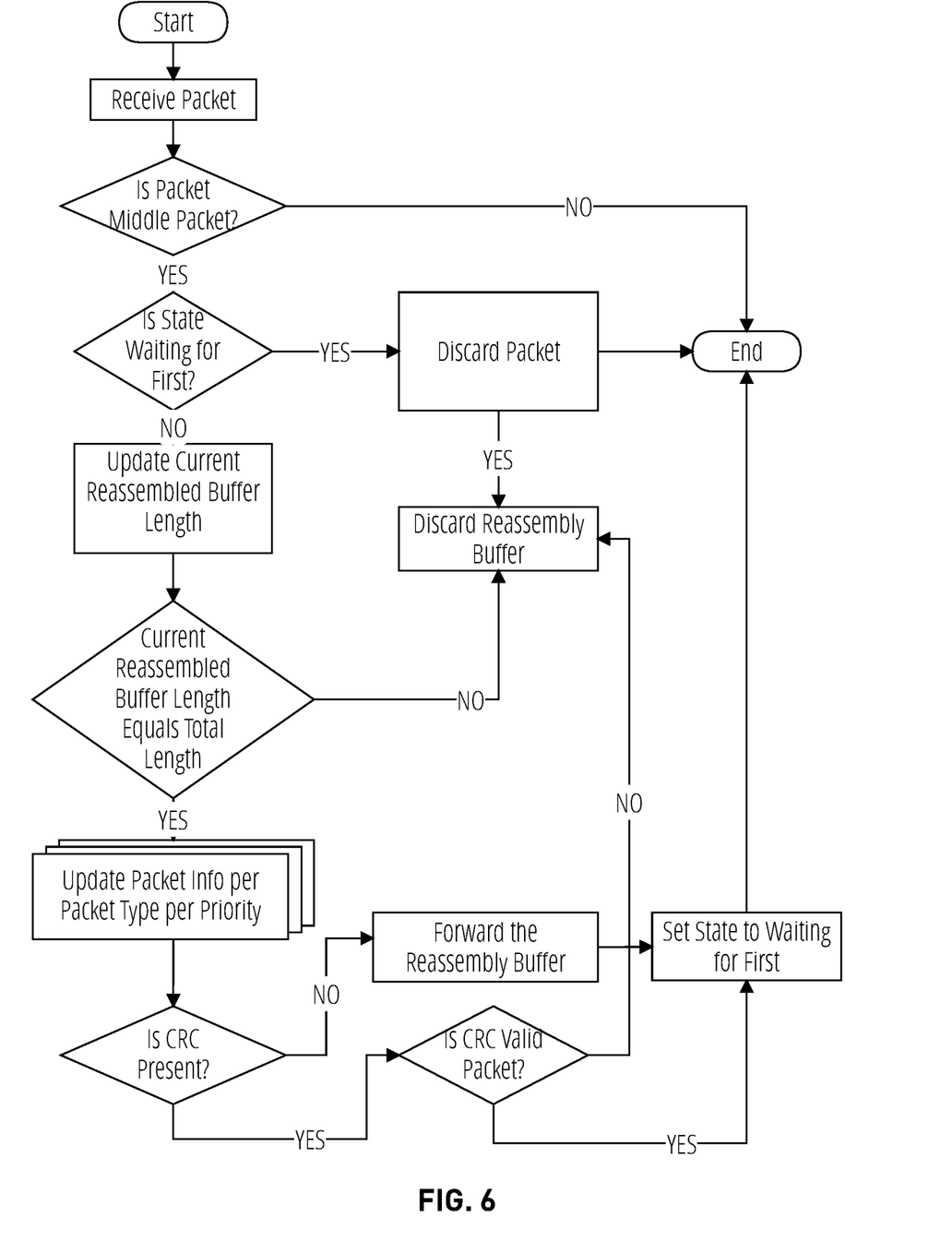
FIG. 6 illustrates handling an incoming last packet according to various embodiments.

FIG. 6 illustrates handling an incoming last packet according to various embodiments.

FIG. 6 illustrates a handling for an incoming last packet. In such cases the receiver validates that the received accumulation of the last packet length matches the total packet length. This is achieved by a simple conditional, where the receiver shall check the whether the first packet total length matches the total calculated length, on a per packet type and per priority basis. In addition, the receiver should also run the CRC check, if supplied, to ensure the integrity of the transmission received.

Figure 7:
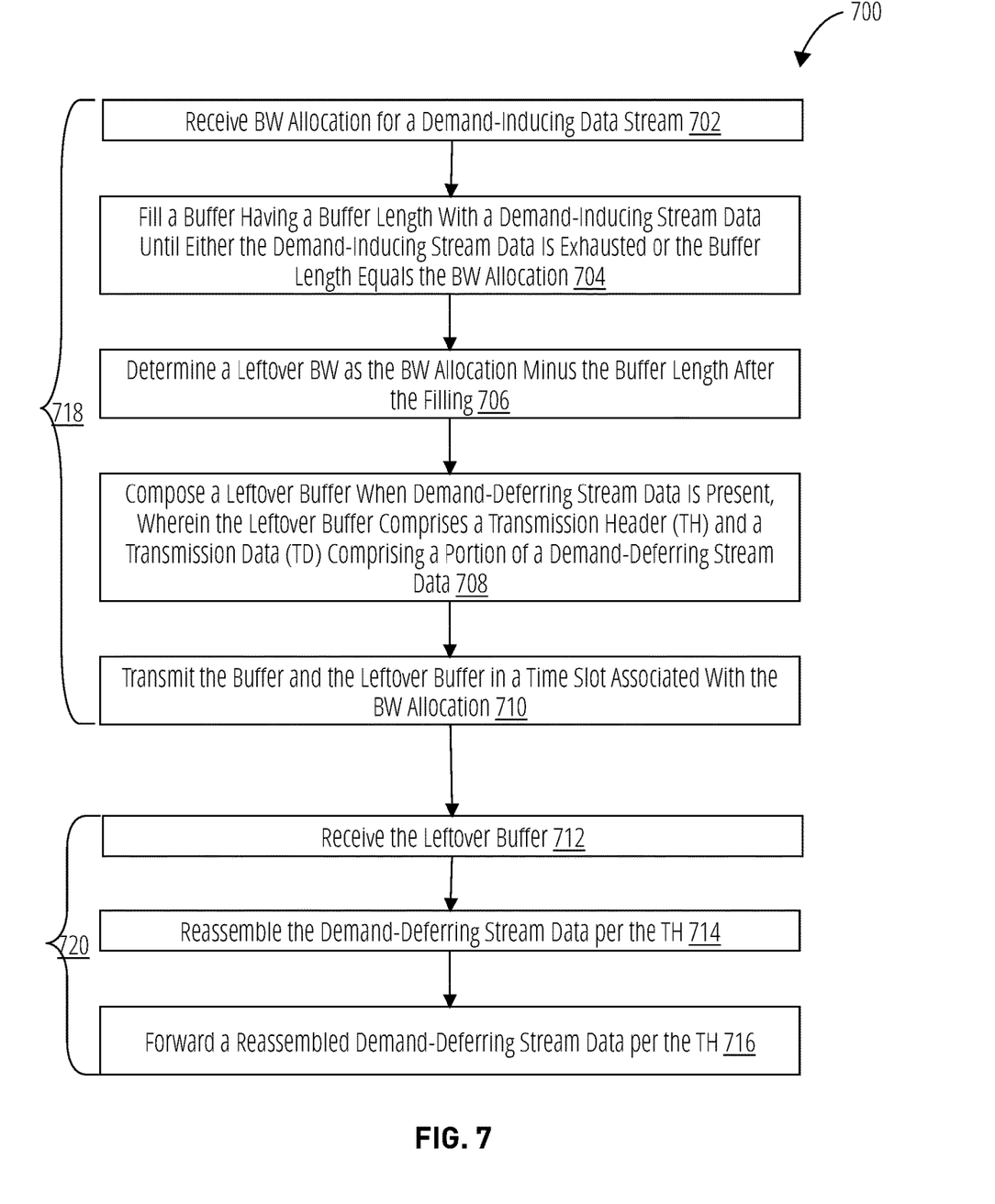
FIG. 7 illustrates a method or using a bandwidth (BW) allocation in a Time Division Multiple Access (TDMA) network in accordance with one embodiment.

FIG. 7 illustrates a method or using a bandwidth (BW) allocation in a Time Division Multiple Access (TDMA) network in accordance with one embodiment.

In operation 702, method receives a BW allocation for a demand-inducing stream data. In operation 704, method 700 fills a buffer having a buffer length with a demand-inducing stream data until either the demand-inducing stream data is exhausted or the buffer length equals the BW allocation. In operation 706, method 700 determines a leftover BW as the BW allocation minus the buffer length after the filling. In operation 708, method 700 composes a leftover buffer when demand-deferring stream data is present, wherein the leftover buffer comprises a transmission header (TH) and a transmission data (TD) comprising a portion of a demand-deferring stream data. In operation 710, method 700 transmits the buffer and the leftover buffer in a time slot associated with the BW allocation. In method 700 a length of the TH plus a length of the TD is less than or equal to the leftover BW. In method 700, operation 702, operation 704, operation 706, operation 708 and operation 710 may be implemented on a transmitter 718.

In operation 712, method 700 receives the leftover buffer. In operation 714, method 700 reassembles the demand-deferring stream data per the TH. In operation 716, method 700 forwards a reassembled demand-deferring stream data per the TH. In method 700, operation 712, operation 714 and operation 716 may be implemented by a receiver 720. In some embodiments, operation 702 may be receiving the BW allocation from the receiver 720.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for using a bandwidth (BW) allocation in a Time Division Multiple Access (TDMA) network, the method comprising:
   filling a buffer having a buffer length with a demand-inducing stream data until either the demand-inducing stream data is exhausted or the buffer length equals the BW allocation;
   determining a leftover BW as the BW allocation minus the buffer length after the filling;
   composing a leftover buffer when demand-deferring stream data is present, wherein the leftover buffer comprises a transmission header (TH) and a transmission data (TD) comprising a portion of a demand-deferring stream data; and
   transmitting the buffer and the leftover buffer in a time slot associated with the BW allocation,
   wherein a length of the TH plus a length of the TD is less than or equal to the leftover BW.

2. The method of claim 1, further comprising receiving the BW allocation from a gateway.

3. The method of claim 1, wherein the TH comprises a packet type indicating that the TD comprises one or more of an Internet Protocol Version 4 packet, an Internet Protocol version 6 packet, an Ethernet frame, or an operator defined packet.

4. The method of claim 1, wherein the TH supports transport modes indicating a best effort or reliable mode of transmission.

5. The method of claim 1, wherein the demand-deferring stream data comprises a priority associated with the demand-deferring stream data, and the adding uses the priority to select data to be added to the leftover buffer.

6. The method of claim 1, wherein the demand-deferring stream data comprises a time-to-live associated with the demand-deferring stream data, and the method further comprises discarding the demand-deferring stream data when the time-to-live has expired.

7. The method of claim 1, further comprising segmenting the demand-deferring stream data such that a length of a segment is less than the leftover BW minus a length of the TH.

8. The method of claim 7, wherein the TH indicates that the TD comprises a whole segment, a first segment, a middle segment or a last segment.

9. The method of claim 1, further comprising:
   receiving the leftover buffer;
   reassembling the demand-deferring stream data per the TH; and
   forwarding a reassembled demand-deferring stream data per the TH.

10. A computing apparatus comprising:
    a processor; and
    a memory storing instructions that, when executed by the processor, configure the apparatus to:
    fill a buffer having a buffer length with a demand-inducing stream data until either the demand-inducing stream data is exhausted or the buffer length equals the BW allocation;
    determine a leftover BW as the BW allocation minus the buffer length after the filling;
    compose a leftover buffer when demand-deferring stream data is present, wherein the leftover buffer comprises a transmission header (TH) and a transmission data (TD) comprising a portion of a demand-deferring stream data; and
    transmit the buffer and the leftover buffer in a time slot associated with the BW allocation,
    wherein a length of the TH plus a length of the TD is less than or equal to the leftover BW.

11. The computing apparatus of claim 10, wherein the instructions further configure the apparatus to receive the BW allocation from a gateway.

12. The computing apparatus of claim 10, wherein the TH comprises a packet type indicate that the TD comprises one or more of an Internet Protocol Version 4 packet, an Internet Protocol version 6 packet, an Ethernet frame, or an operator defined packet.

13. The computing apparatus of claim 10, wherein the TH supports transport modes indicate a best effort or reliable mode of transmission.

14. The computing apparatus of claim 10, wherein the demand-deferring stream data comprises a priority associated with the demand-deferring stream data, and the adding uses the priority to select data to be added to the leftover buffer.

15. The computing apparatus of claim 10, wherein the demand-deferring stream data comprises a time-to-live associated with the demand-deferring stream data, and the method further comprises discard the demand-deferring stream data when the time-to-live has expired.

16. The computing apparatus of claim 10, wherein the instructions further configure the apparatus to segment the demand-deferring stream data such that a length of a segment is less than the leftover BW minus a length of the TH.

17. The computing apparatus of claim 16, wherein the TH indicates that the TD comprises a whole segment, a first segment, a middle segment or a last segment.

18. The computing apparatus of claim 10, wherein the instructions further configure the apparatus to:
    receive the leftover buffer;
    reassemble the demand-deferring stream data per the TH; and
    forward a reassembled demand-deferring stream data per the TH.

* * * * *